US010088386B2

(12) United States Patent
Liu et al.

(10) Patent No.: US 10,088,386 B2
(45) Date of Patent: Oct. 2, 2018

(54) DEVICE AND METHOD FOR MEASURING THREE-DIMENSIONAL CONTACT STIFFNESS OF SPUR GEAR BASED ON ROUGH SURFACE

(71) Applicant: Beijing University of Technology, Beijing (CN)

(72) Inventors: Zhifeng Liu, Beijing (CN); Tao Zhang, Beijing (CN); Yongsheng Zhao, Beijing (CN); Shuxin Bi, Beijing (CN)

(73) Assignee: Beijing University of Technology, Beijing (CN)

( * ) Notice: Subject to any disclaimer, the term of this patent is extended or adjusted under 35 U.S.C. 154(b) by 0 days.

(21) Appl. No.: 15/798,320

(22) Filed: Oct. 30, 2017

(65) Prior Publication Data

US 2018/0128710 A1 May 10, 2018

Related U.S. Application Data

(63) Continuation-in-part of application No. PCT/CN2016/107233, filed on Nov. 25, 2016.

(30) Foreign Application Priority Data

Nov. 9, 2016 (CN) .......................... 2016 1 0985604

(51) Int. Cl.
*G01M 13/02* (2006.01)
(52) U.S. Cl.
CPC ................................ *G01M 13/021* (2013.01)
(58) Field of Classification Search
CPC ..... G01M 13/021; G01M 13/00; G01M 13/02
See application file for complete search history.

(56) References Cited

U.S. PATENT DOCUMENTS

2006/0254055 A1* 11/2006 Sabourin ............. G01M 13/021
29/893.1
2013/0116937 A1* 5/2013 Calhoun ............. G01M 13/028
702/35

FOREIGN PATENT DOCUMENTS

CN        104573196 A     4/2015
CN        105224744 A     1/2016
(Continued)

OTHER PUBLICATIONS

Peng Liu, Surface morphology and stiffness model based on fractal theory of inner bevel planetary gear Chinese Master's Theses Full-text Database Engineering Science & Technology II Jun. 15, 2014, ISSN:1674-0246 Section 4.2.

*Primary Examiner* — Mohamed Charioui
*Assistant Examiner* — Jeremy Delozier
(74) *Attorney, Agent, or Firm* — Zhihua Han; Le Tian (57) ABSTRACT

Embodiments relate to devices and/or methods for measuring three-dimensional contact stiffness of spur gear based on rough surfaces. A hexagonal mesh is used for partitioning, and areas of each square meshes are identical with respect to tooth surfaces. The embodiments include calculating contact pressure distribution of smooth tooth surface based on a finite element method and extracting node pressure of contact area $P_i$; and calculating contact stiffness of gear surface. Measurement herein is more precise and avoid disadvantages generated by hertz theory and the free-sliding interface. Gear stiffness properties and calculation methods are influenced by roughness parameters during rough tooth surface contacting processes. The embodiments use a finite element 3D contact stiffness calculation model, which is more accurate than former 2D calculation model or calculation formula. Errors associated with fabrication and manufacture processes are considered to makes gear contact (Continued)

stiffness more accurate and to establish the foundation of gear dynamics.

6 Claims, 5 Drawing Sheets

(56) References Cited

FOREIGN PATENT DOCUMENTS

| | | |
|---|---|---|
| CN | 105302991 A | 2/2016 |
| JP | 2003194754 A | 7/2003 |

\* cited by examiner

DEVICE AND METHOD FOR MEASURING THREE-DIMENSIONAL CONTACT STIFFNESS OF SPUR GEAR BASED ON ROUGH SURFACE

CROSS-REFERENCE TO RELATED APPLICATION

This application is a continuation-in-part application of International application number PCT/CN2016/107233, filed Nov. 25, 2016, titled "Three-dimensional contact stiffness calculation method of spur gear based on rough surface," which claims the priority benefit of Chinese Patent Application No. 201610985604.5, filed on Nov. 9, 2016, which is hereby incorporated by reference in its entirety.

TECHNICAL FIELD

The present disclosure belongs to gear mechanics analysis and kinetic study area, especially to a three-dimensional contact stiffness calculation method and/or device of spur gear based on rough surface.

BACKGROUND

Internal excitation of a gear pair is generated by an inner system during a gear pair meshing process, which is also a difficult and important point in the gear system kinetic study. Internal excitation of a gear system is divided into three manners: time-varying stiffness excitation, time-varying error excitation, and meshing contact excitation. Time-varying stiffness excitation may be associated with three parameters: bending stiffness of gears, shearing stiffness, and contact stiffness. IO56336 meshing stiffness calculation formula and taking gear stiffness excitation equivalent to Fourier expansion are extensively used currently. Hertzian contact theory based on a smooth surface is further used for deducing contact stiffness calculation. However, deformation of a contact state of rough surfaces of actual gear may not be simulated precisely. To build more effective gear kinetic models, there is a need for improvement of devices and methods for measuring three-dimensional contact stiffness of spur gear based on rough surface.

SUMMARY

The present disclosure provides a three-dimensional contact stiffness calculation method of spur gear based on rough surface, this method makes gear contact stiffness model precisely, while at the same time, uneven distribution of gear meshing load caused by assembling and manufacture error is fully considered.

The present disclosure uses technical schema below to achieve the target mentioned above: S1 hexagonal mesh is used for partition, area of each square mesh is same in tooth surface which is expressed as $A_0$; S2 calculating contact pressure distribution of smooth tooth surface based on finite element method, extracting node pressure of contact area $P_i$; S3 calculating normal contact stiffness $K_N$ and tangential contact stiffness $K_T$ of single square mesh based on fractional theory; and S4 calculating tooth surface contact stiffness K.

S1 comprises the following steps:
Hexagonal mesh is used for partition, set the side length of hexagonal mesh is 1 mm. Therefore, meshes obtained on the contact surface of gear pair are all standard square meshes, mesh area is: $A_0 = 1^2$ mm$^2$.

S2 comprises the following steps:
Gear pair after partition is imported into Ansoft HFSS, set statics analysis environment, center hole of passive gear is immobilized through defining material property and contact pair, then, imposing torque T on the axis of driving gear, specific contact surface stress of current gear and strain image through load-step, extracting node pressure $P_i$ of contact area on contact surface.

S3 comprises the following steps:
Meshes used in FEA (finite element analysis) is small enough, extracted node pressure $P_i$ can be considered as contacting pressure inner square mesh on tooth surface, therefore, contact force of different square meshes on tooth surface can be expressed as:

$$F_i = P_i A_0 \qquad (1)$$

since machined tooth surface has fractal feature and has local and global self-similarity; the outline of rough tooth surface is expressed as a W-M function:

$$z(x) = G^{(D-1)} \sum_{n=0}^{n_{max}} \left( \frac{\cos 2\pi \gamma^n x}{\gamma^{(2-D)n}} \right) 1 < D < 2, \gamma > 1 \qquad (2)$$

n represents frequency index, n=0 and $n_{max}$ represents sequence corresponding to minimum and maximum cut-off frequency, z represents the height of rough surface outline, D represents fractal dimension, γ represents dimension parameter of spectral density, G represents roughness parameter, x represents sampling length coordinates; gear square sample is obtained by using same material and processing method, tooth surface morphology coordinates is obtained by surface plasmon resonance analyzer, D and G is obtained through matching W-M function with power spectral density method;

in contact model of gear pair: contact between two rough surfaces is simplified as a stiffness surface contacts with a rough surface; dotted line is neutral surface which represents contact location of ideal smooth gear, prominent part on rough surface which is on the top of neutral surface is defined as micro-bulge; rough surface is consisted of countless cyclic micro-bulges with uneven size, assuming that each micro-bulge is apart, interaction is negligible; when rough surface contacts with stiffness surface, elastic or plastic deformation of different micro-bulges happened under pressure, distribution regularities of micro-bulge cross-section area a' satisfies:

$$n(a') = \frac{1}{2} D \psi^{(2-D)/2} a_L'^{D/2} a'^{-(2+D)/2} 0 < a' \leq a_L' \qquad (3)$$

a' represents cross-section area of micro-bulge before deformation associated with stiffness surface, a represents cross-section area of micro-bulge after deformation associated with stiffness surface which is defined as real contact area, when elastic deformation of micro-bulge happened a'=2a, when plastic deformation of micro-bulge happened a'=a, D represents fractal dimension, $a_L'$ represents maximum cross-section area, φ represents domain development factor, it can be obtained from transcendental equation (4):

$$[\psi^{(2-D)/2} - (1+\psi^{-D/2})^{-(2-D)/D}] / [(2-D)/D] = 1 \qquad (4)$$

deformation of micro-bulge is divided into elastic and plastic according to the different cross-section area of micro-bulge, cross-section area which determines plastic or elastic deformation of micro-bulge is called as critical cross-section area, it is determined by material properties of gear pair:

$$a'_c = 2a_c = 2\left(\frac{2E^*}{H}\right)^{2/(D-1)} G^2 \quad (5)$$

H represents hardness of soft material, H=2.8 Y, Y represents yield strength value; E* represents equivalent elastic modulus, $$E^* = \frac{1-v_1^2}{E_1} + \frac{1-v_2^2}{E_2}, E_1, E_2, v_1, v_2$$

represents elasticity modulus and poisson ratio of two contact tooth surface respectively; if micro-bulge cross section area a'>$a_c$', elastic deformation happened, if a'≤$a_c$', plastic deformation happened, normal deformat of single micro-bulge of rough surface is expressed by middle peak-valley amplitude of W-M function, $$\delta = 2^{3-D} G^{(D-1)} (\ln \gamma)^{1/2} \pi^{(D-2)/2} (a')^{(2-D)/2} \quad (6)$$

curvature R of single micro-bulge is:

$$R = \frac{a'^{D/2}}{2^{4-D} \pi^{D/2} G^{D-1} (\ln \gamma)^{1/2}} \quad (7)$$

elastic or plastic deformation for single micro-bulge, its normal load f and cross section area a' satisfies:

$$f_e = \frac{4}{3} E^* R^{\frac{1}{2}} \delta^{\frac{3}{2}} \quad (8)$$

$$f_p = Ha' \quad (9)$$

subscript e and p represents elastic and plastic deformation respectively, $$E^* = \frac{1-v_1^2}{E_1} + \frac{1-v_2^2}{E_2}$$

represents equivalent elastic modulus, H represents hardness of soft the material, H=2.8 Y, R and δ represents curvature and normal deformat of single micro-bulge respectively;

elastic deformation force $F_E$ and total plastic deformation force $F_P$ is expressed as:

$$F_E = \int_{a'_c}^{a'_L} f_e n(a') da' = \begin{cases} \frac{2^{(9-2D)/2} D}{3(3-2D)\pi^{(3-D)/2}} E^* (\ln\gamma)^{1/2} G^{(D-1)} \times \\ \psi^{1-\frac{D}{2}} a'^{\frac{D}{2}}_L \left(a'^{\frac{3}{2}-D}_L - a'^{\frac{3}{2}-D}_c\right)(D \ne 1.5) \\ 2E^* \psi^{\frac{1}{4}} \pi^{-\frac{3}{4}} (\ln\gamma)^{\frac{1}{2}} G^{\frac{1}{2}} a'^{\frac{3}{4}}_L \ln \frac{a'_L}{a'_c} (D = 1.5) \end{cases} \quad (10)$$

$$F_P = \int_0^{a'_c} f_p n(a') da' = \frac{HD \psi^{(2-D)/2}}{2-D} a'^{D/2}_L a'^{(2-D)/2}_c \quad (11)$$

Therefore, total contact pressure inner single square mesh is obtained as:

$$F_i = F_E + F_P \quad (12)$$

S3 also comprises the following steps:

Maximum across section area $a_l'$ of single square mesh is obtained through equation (1) and (12);

As for single micro-bulge, its deformation is divided into total elastic and total plastic deformation, at plastic deformation stage, stiffness=0; according to stiffness definition, normal contact stiffness of single micro-bulge which occurs total elastic deformation is expressed as:

$$k_n = \frac{df_e}{d\delta} = \frac{df_e/da'}{d\delta/da'} = \frac{4E^*(3-D)}{3\sqrt{2\pi}(2-D)} a'^{\frac{1}{2}} \quad (13)$$

normal contact stiffness inner single square mesh is obtained through integration for the total elastic area:

$$K_N = \int_{a'_c}^{a'_L} k_n n(a') da' = \quad (14)$$

$$\frac{4E^*(3-D)D}{3\sqrt{2\pi}(1-D)(2-D)} \times \psi^{1-D/2} a'^{D/2}_L (a'^{(1-D)/2}_L - a'^{(1-D)/2}_c)$$

tangential deflection $\delta_t$ of single micro-bulge is expressed as:

$$\delta_t = \frac{3\mu f}{16 G' r}\left[1 - \left(1 - \frac{t}{\mu f}\right)^{2/3}\right] \quad (15)$$

μ represents static friction coefficient, G' represents effective shear modulus of junction surface and satisfies: $1/G'= (2-v_1)/G_1 + (2-v_2)/G_2$, $v_1$, $v_2$, $G_1$, $G_2$ represent poisson ratio and shear modulus of two kinds of materials, t and f represents tangential and normal load, r represents real contact area radius of single micro-bulge r=√(a/π), a represents real contact area;

therefore, tangential stiffness single micro-bulge is expressed as:

$$k_t = \frac{dt}{d\delta_t} \quad (16)$$

as for tangential load t and normal load f:

$$\frac{t}{f} = \frac{T}{F_i} \quad (17)$$

T=$\tau_b A_r$, $\tau_b$ represents shearing strength, $A_r$ represents actual contact area of the square mesh, $$A_r = \int_0^{a'_c} a' n(a') da' + \frac{1}{2} \int_{a'_c}^{a'_L} a' n(a') da' = \quad (18)$$

$$\frac{D}{4-2D} \psi^{1-\frac{D}{2}} a'^{D/2}_L (a'^{1-D/2}_L + a'^{1-D/2}_c)$$

the tangential stiffness of single square mesh $K_T$ is expressed as:

$$K_T = \int_{a'_c}^{a'_L} k_t n(a') da' = \frac{8G'D\psi^{(2-D)/2}}{\sqrt{2\pi}(1-D)}\left(1 - \frac{T}{\mu P}\right)^{1/3} \times a_L'^{D/2}(a_L'^{(1-D)/2} - a_c'^{(1-D)/2}). \quad (19)$$

S4 comprises the following steps:

Assuming the number of square mesh on specific tooth surface is m, normal contact stiffness of contact tooth surface $K_1$ is expressed as:

$$K_1 = \sum_{i=1}^{m} K_N \quad (20)$$

tangential contact stiffness of contact tooth surface $K_2$ is expressed as:

$$K_2 = \sum_{i=1}^{m} K_T \quad (21)$$

the stiffness of contact tooth surface is expressed as:

$$K = K_1 \cos\alpha + K_2 \sin\alpha \quad (22)$$

α represents pressure angle.

Comparing with current technics, the beneficial advantages of the present disclosure are:

The present disclosure discloses a three-dimensional contact stiffness calculation method of spur gear based on rough surface, calculation model of gear contact stiffness is more precise, disadvantages generated by hertz theory and the free-sliding interface is avoided, it reveals the gear stiffness properties and calculation method which influenced by roughness parameter during rough tooth surface contacting process. While at the same time, the present disclosure uses finite element 3D contact stiffness calculation model which is more accurate than former 2D calculation model or calculation formula. Errors generate during fabrication and manufacture process is also considered in the present disclosure which makes gear contact stiffness more accurate, it establishes the foundation of gear dynamics.

In spur gear contact stiffness model built by the present disclosure, roughness parameters are involved for the first time, the relationship between processing method and gear contact stiffness is described indirectly. Fractal theory is firstly used in different square meshes in contact area through special finite element mesh partition method. 3D contact stiffness of gear is obtained through the accumulation of meshes in the different contact area. Influence of meshing stiffness by unbalancing loading which is resulted from fabrication and manufacturing errors of the gear pair is avoided.

S1, S2, S3 in the present disclosure is also suitable for other types of gear.

affectively injured or not can be judged and evaluated compared with the normal person.

DETAILED DESCRIPTION OF THE PREFERRED EMBODIMENTS

The present disclosure will be described in more detail accompany with the FIGS. 1-5 and the preferred embodiments.

Embodiments herein relate to a device (e.g., a reducer device) for controlling speed of spur gears, the device comprising: multiple spur gears; a pressure measurer configured to collect parameters associated with a node pressure of the multiple spur gears; a gear stiffness calculator configured to calculate tooth surface contact stiffness K based on rough surface of the multiple spur gears by: partitioning each tooth surface of spur gears using a hexagonal mesh partition manner such that an area of each square mesh is identical and is expressed as $A_0$, calculating a contact pressure distribution of smooth surface of the multiple spur gears, extracting the node pressure of contact areas of the spur gears based on the contact pressure distribution, the node pressure represented by $P_i$, calculating normal contact stiffness $K_N$ and tangential contact stiffness $K_T$ of single square mesh based on a fractional theory using $A_0$ and $P_i$, and calculating the tooth surface contact stiffness K based $K_N$ and $K_T$; and a reducer configured to modified (e.g., reduce) the speed of the spur gears based on the tooth surface contact stiffness K of the spur gears. Here, the reducer refers to a mechanical device to change the amount of torque generated by an input power source to increase the amount of usable work or reduce the input power source speed to achieve desired output speeds of the gears. In some embodiments, the parameters may include material features of each gear of the gear pairs, contract pairs, central holes of fixed of a passive gear of the gear pairs.

Figure 5:
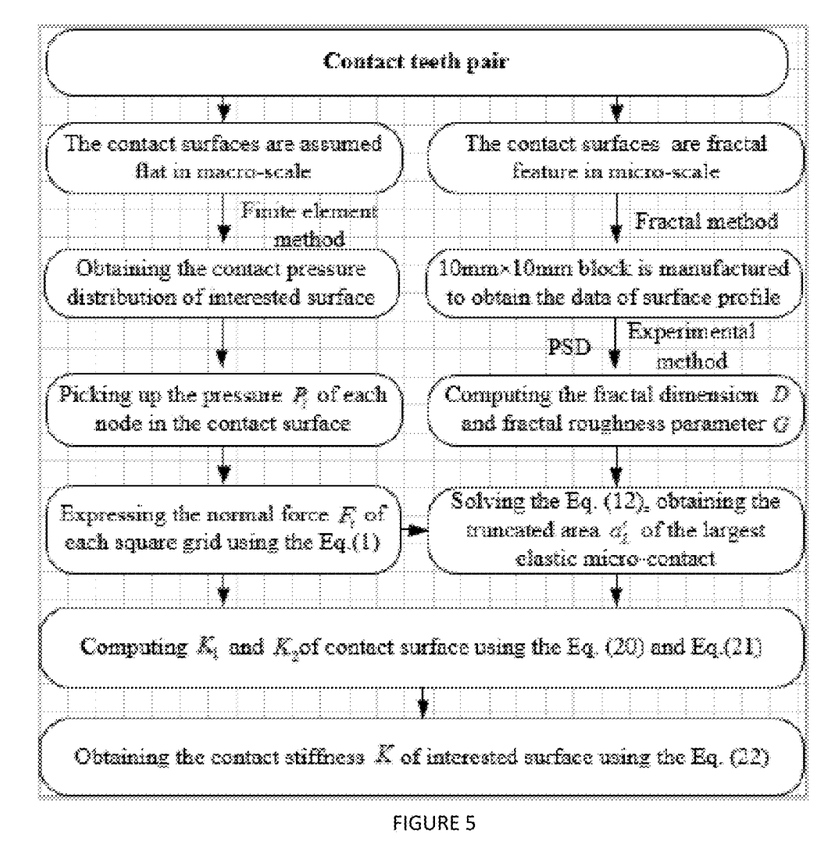
FIG. 5 is a computational flow diagram of the technical schema.

In some embodiments, the gear stiffness calculator may be implemented to perform one or more operations illustrated in FIG. 5. In some embodiments, $A_0$ is calculated using the equation: $A_0 = l^2$ mm$^2$, and a side length of the area of each square mesh is l mm. In some embodiments, the extracting the node pressure of contact areas of the spur gears based on the contact pressure distribution comprises: obtaining gear pairs of the multiple spur gears after the partition; defining material features of each gear of the gear pairs, contract pairs, central holes of fixed of a passive gear of the gear pairs; obtaining a stress and strain cloud image of a specific contact surface of a current gear based on imposed torque T on axis of a driving gear of the gear pairs; and extracting the node pressure $P_i$ using of the stress and strain cloud image.

Figure 1:
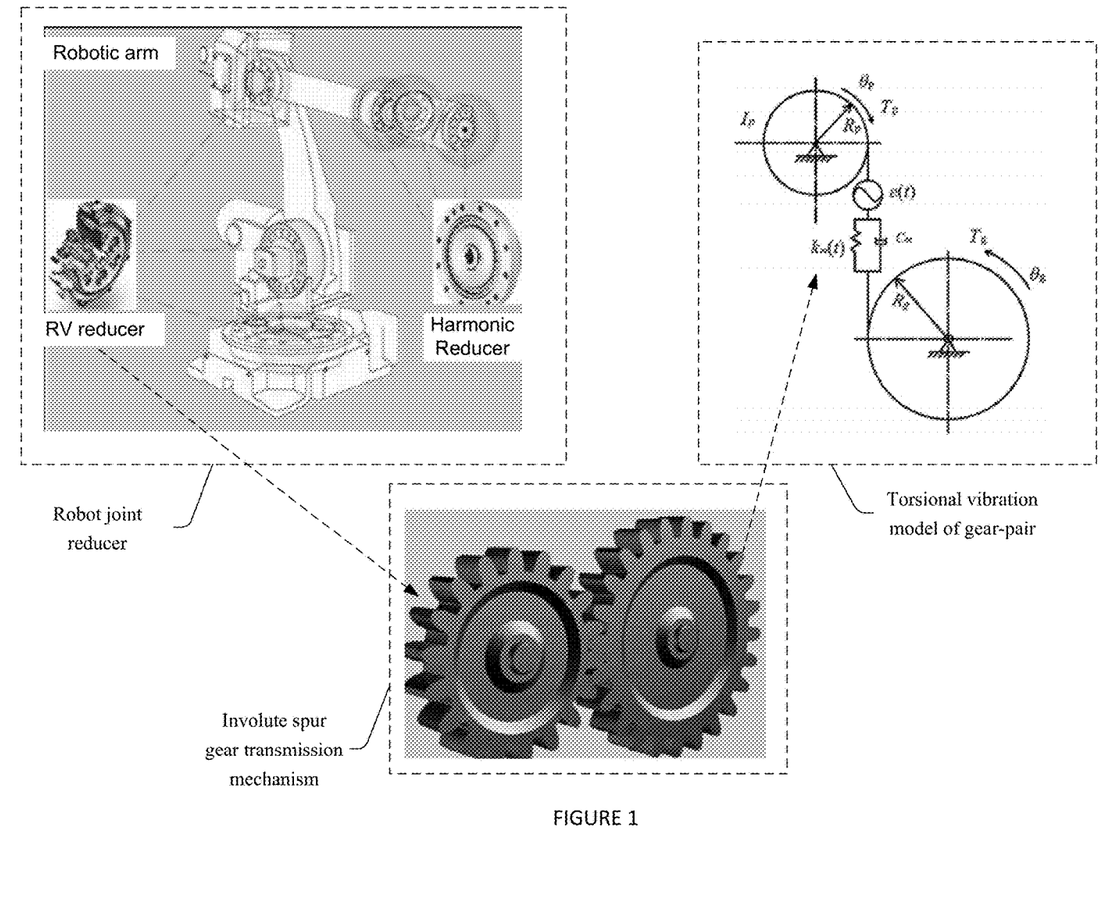
FIG. 1 is a schematic diagram showing various embodiments of the present disclosure.

In some embodiments, an example of the device may include a robotic joint reducer, arm joint reducer, a machine reducer for vehicles, and/or an aerospace reducer containing various involute spur gears shown in FIG. 1. In these instances, stiffness coefficient k (t) and damping coefficient c (t) associated with the spur gears may be calculated to establish a kinetic model for the device to control the speed of the spur gears.

Some embodiments relate to the three-dimensional contact stiffness calculation method of spur gear based on rough surface, which may be implemented by the device described above. The method may include the following steps:

1) Hexagonal mesh is used for partition, area of each square mesh is same in tooth surface which is expressed as $A_0$;
2) Calculating contact pressure distribution of smooth tooth surface based on finite element method, extracting node pressure of contact area $P_i$;
3) Calculating normal contact stiffness $K_N$ and tangential contact stiffness $K_T$ of single square mesh based on fractional theory;
4) Calculating tooth surface contact stiffness K.

1) comprises the following steps: hexagonal mesh is used for partition, set the side length of hexagonal mesh is 1 mm. Therefore, meshes obtained on the contact surface of gear pair are all standard square meshes, mesh area is: $A_0 = 1^2$ mm².

2) comprises the following steps: gear pair after partition is imported into Ansoft HFSS, set statics analysis environment, center hole of passive gear is immobilized through defining material property and contact pair, then, imposing torque T on the axis of driving gear, specific contact surface stress of current gear and strain image through load-step, extracting node pressure $P_i$ of contact area on contact surface.

3) comprises the following steps: meshes used in FEA (finite element analysis) is small enough, extracted node pressure $P_i$ can be considered as contacting pressure inner square mesh on tooth surface, therefore, contact force of different square meshes on tooth surface can be expressed as:

$$F_i = P_i A_0 \quad (1)$$

since machined tooth surface has fractal feature and has local and global self-similarity; the outline of rough tooth surface is expressed as a W-M function:

$$z(x) = G^{(D-1)} \sum_{n=0}^{n_{max}} \left( \frac{\cos 2\pi \gamma^n x}{\gamma^{(2-D)n}} \right) 1 < D < 2, \gamma > 1 \quad (2)$$

n represents frequency index, n=0 and $n_{max}$ represents sequence corresponding to minimum and maximum cut-off frequency, z represents the height of rough surface outline, D represents fractal dimension, γ represents dimension parameter of spectral density, G represents roughness parameter, x represents sampling length coordinates; gear square sample is obtained by using same material and processing method, tooth surface morphology coordinates is obtained by surface plasmon resonance analyzer, D and G is obtained through matching W-M function with power spectral density method.

Figure 2:
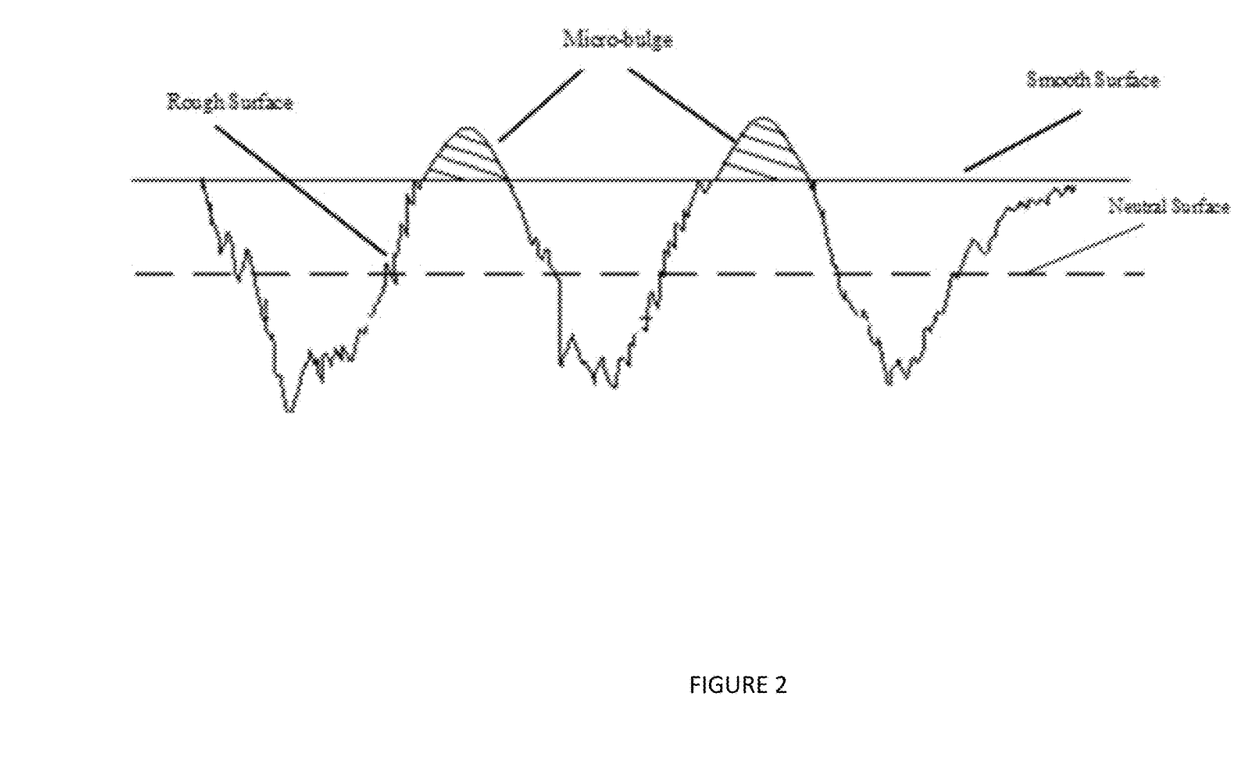
FIG. 2 is a simplified diagram of the gear pair.
Figure 3:
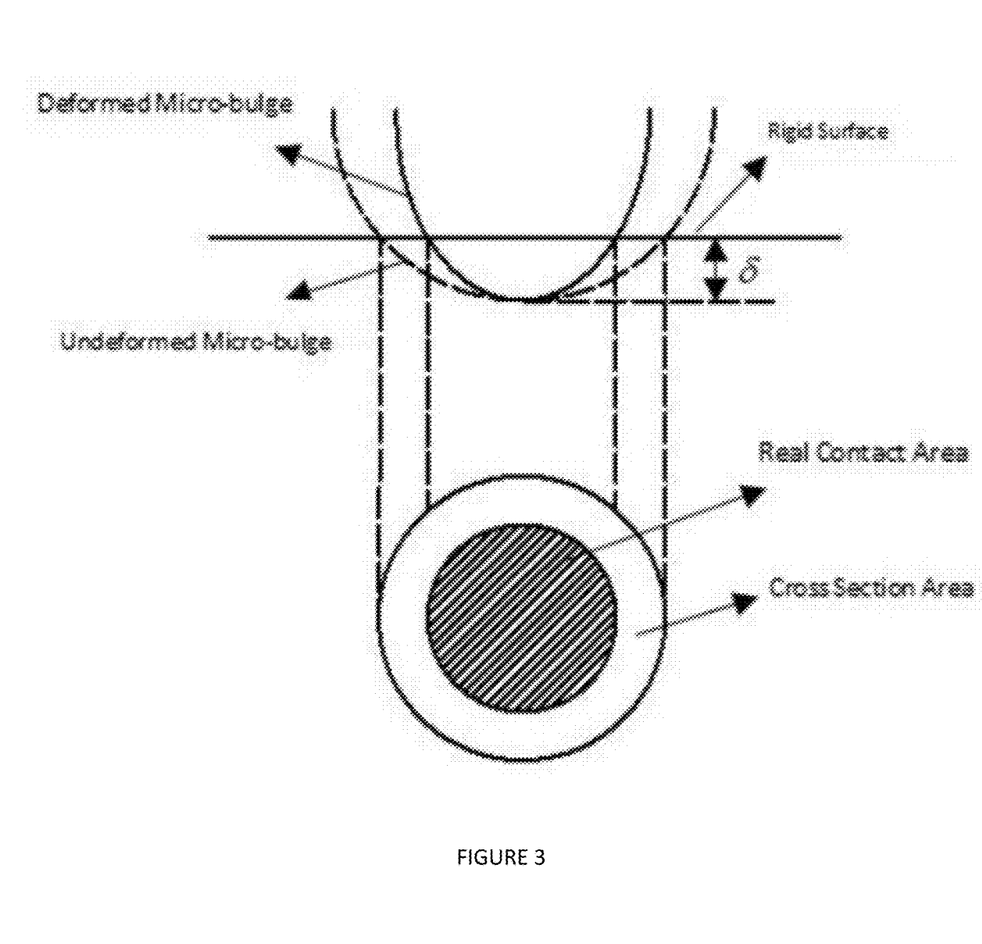
FIG. 3 is a contact area diagram of single micro-bulge.

In contact model of gear pair: contact between two rough surfaces is simplified as a stiffness surface contact with a rough surface which is shown in FIG. 2. The dotted line is a neutral surface which represents contact location of ideal smooth gear, prominent part on the rough surface which is on the top of the neutral surface is defined as micro-bulge, which is shown in FIG. 3. The rough surface is consisted of countless cyclic micro-bulges with uneven size, assuming that each micro-bulge is apart, interaction is negligible; when rough surface contacts with stiffness surface, elastic or plastic deformation of different micro-bulges happened under pressure, distribution regularities of micro-bulge cross-section area a' satisfies:

$$n(a') = \frac{1}{2} D \psi^{(2-D)/2} a_L'^{D/2} a'^{-(2+D)/2} \quad 0 < a' \le a_L' \quad (3)$$

a' represents cross-section area of micro-bulge before deformation associated with stiffness surface, a represents cross-section area of micro-bulge after deformation associated with stiffness surface which is defined as real contact area, when elastic deformation of micro-bulge happened a'=2a, when plastic deformation of micro-bulge happened a'=a, D represents fractal dimension, $a_L'$ represents maximum cross-section area, φ represents domain development factor, it can be obtained from transcendental equation (4):

$$[\psi^{(2-D)/2} - (1+\psi^{-D/2})^{-(2-D)/D}]/[(2-D)/D] = 1 \quad (4)$$

Deformation of micro-bulge is divided into elastic and plastic according to the different cross-section area of micro-bulge, cross-section area which determines plastic or elastic deformation of micro-bulge is called as critical cross-section area, it is determined by material properties of gear pair:

$$a_c' = 2a_c = 2\left(\frac{2E^*}{H}\right)^{2/(D-1)} G^2 \quad (5)$$

H represents hardness of soft material, H=2.8 Y, Y represents yield strength value; $E^*$ represents equivalent elastic modulus, $$E^* = \frac{1-v_1^2}{E_1} + \frac{1-v_2^2}{E_2}, E_1, E_2, v_1, v_2$$

represents elasticity modulus and poisson ratio of two contact tooth surface respectively; if micro-bulge cross section area a'>$a_c'$, elastic deformation happened, if a'≤$a_c'$, plastic deformation happened, normal deformat of single micro-bulge of rough surface is expressed by middle peak-valley amplitude of W-M function, $$\delta = 2^{3-D} G^{(D-1)} (\ln \gamma)^{1/2} \pi^{(D-2)/2} (a')^{(2-D)/2} \quad (6)$$

curvature R of single micro-bulge is:

$$R = \frac{a'^{D/2}}{2^{4-D} \pi^{D/2} G^{D-1} (\ln\gamma)^{1/2}} \quad (7)$$

elastic or plastic deformation for single micro-bulge, its normal load f and cross section area a' satisfies:

$$f_e = \frac{4}{3} E^* R^{\frac{1}{2}} \delta^{\frac{3}{2}} \quad (8)$$

$$f_p = H a' \quad (9)$$

Subscript e and p represents elastic and plastic deformation respectively, $$E^* = \frac{1-v_1^2}{E_1} + \frac{1-v_2^2}{E_2}$$

represents equivalent elastic modulus, $E_1$, $E_2$, $v_1$, $v_2$ represents elasticity modulus and poisson ratio of two contact tooth surface respectively. H represents hardness of soft material, H=2.8 Y, R and δ represents curvature and normal deformat of single micro-bulge respectively.

Elastic deformation force $F_E$ and total plastic deformation force $F_P$ is expressed as:

$$F_E = \qquad (10)$$

$$\int_{a'_c}^{a'_L} f_e n(a')da' = \begin{cases} \frac{2^{(9-2D)/2}D}{3(3-2D)\pi^{(3-D)/2}} E^*(\ln\gamma)^{1/2} G^{(D-1)} \times \\ \psi^{1-\frac{D}{2}} a_L'^{\frac{D}{2}} \left(a_L'^{\frac{3}{2}-D} - a_c'^{\frac{3}{2}-D}\right) & (D \neq 1.5) \\ 2E^*\psi^{\frac{1}{4}} \pi^{-\frac{3}{4}} (\ln\gamma)^{\frac{1}{2}} G^{\frac{1}{2}} a_L'^{\frac{3}{4}} \ln\frac{a_L'}{a_c'} & (D = 1.5) \end{cases}$$

$$F_P = \int_0^{a'_c} f_p n(a')da' = \frac{HD\psi^{(2-D)/2}}{2-D} a_L'^{D/2} a_c'^{(2-D)/2} \qquad (11)$$

therefore, total contact pressure inner single square mesh is obtained as:

$$F_i = F_E + F_P \qquad (12)$$

3) also comprises the following steps:

Maximum across section area $a_l'$ of single square mesh is obtained through equation (1) and (12);

As for single micro-bulge, its deformation is divided into total elastic and total plastic deformation, at plastic deformation stage, stiffness=0; according to stiffness definition, normal contact stiffness of single micro-bulge which occurs total elastic deformation is expressed as:

$$k_n = \frac{df_e}{d\delta} = \frac{df_e/da'}{d\delta/da'} = \frac{4E^*(3-D)}{3\sqrt{2\pi}(2-D)} a'^{\frac{1}{2}} \qquad (13)$$

Normal contact stiffness inner single square mesh is obtained through integration for the total elastic area:

$$K_N = \int_{a'_c}^{a'_L} k_n n(a')da' = \qquad (14)$$

$$\frac{4E^*(3-D)D}{3\sqrt{2\pi}(1-D)(2-D)} \times \psi^{1-D/2} a_l'^{D/2} (a_l'^{1-D/2} - a_c'^{(1-D)/2})$$

Tangential deflection $\delta_t$ of single micro-bulge is expressed as:

$$\delta_t = \frac{3\mu f}{16G'r}\left[1 - \left(1 - \frac{t}{\mu f}\right)^{2/3}\right] \qquad (15)$$

μ represents static friction coefficient, G' represents effective shear modulus of junction surface and satisfies: $1/G' = (2-v_1)/G_1 + (2-v_2)/G_2$, $v_1$, $v_2$, $G_1$, $G_2$ represent poisson ratio and shear modulus of two kinds of materials t and f represents tangential and normal load, r represents real contact area radius of single micro-bulge $r=\sqrt{a/\pi}$, a represents real contact area.

Therefore, tangential stiffness single micro-bulge is expressed as:

$$k_t = \frac{dt}{d\delta_t} \qquad (16)$$

As for tangential load t and normal load f of single micro-bulge:

$$\frac{t}{f} = \frac{T}{F_i} \qquad (17)$$

$T = \tau_b A_r$, $\tau_b$ represents shearing strength, $A_r$ represents actual contact area of the square mesh, $$A_r = \int_0^{a'_c} a'n(a')da' + \frac{1}{2}\int_{a'_c}^{a'_L} a'n(a')da' = \qquad (18)$$

$$\frac{D}{4-2D}\psi^{1-\frac{D}{2}} a_l'^{D/2} (a_l'^{1-D/2} + a_c'^{1-D/2})$$

Tangential stiffness of single square mesh $K_T$ is expressed as $$K_T = \int_{a'_c}^{a'_L} k_t n(a')da' = \qquad (19)$$

$$\frac{8G'D\psi^{(2-D)/2}}{\sqrt{2\pi}(1-D)}\left(1 - \frac{T}{\mu P}\right)^{1/3} \times a_l'^{D/2}(a_l'^{(1-D)/2} - a_c'^{(1-D)/2})$$

4) comprises the following steps:

Assuming the number of square mesh on specific tooth surface is m, normal contact stiffness of contact tooth surface $K_1$ is expressed as:

$$K_1 = \sum_{i=1}^{m} K_N \qquad (20)$$

Tangential contact stiffness of contact tooth surface $K_2$ is expressed as $$K_2 = \sum_{i=1}^{m} K_T \qquad (21)$$

Figure 4:
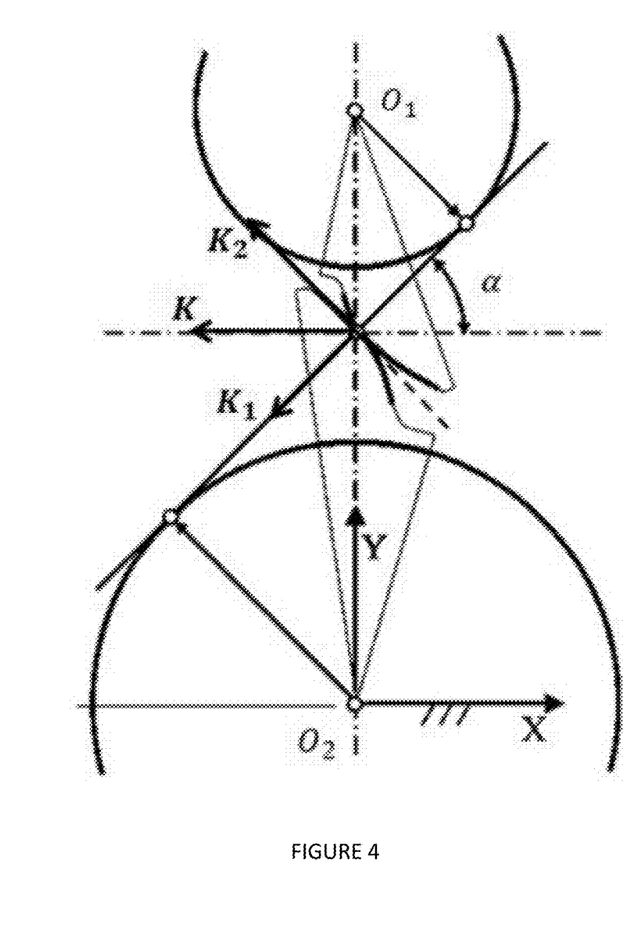
FIG. 4 is a transformation diagram of spur gear contact stiffness.

According to FIG. 4, the stiffness of contact tooth surface is expressed as:

$$K = K_1 \cos\alpha + K_2 \sin\alpha \qquad (22)$$

α represents pressure angle.

What is claimed is:

1. A device for controlling speed of spur gears, the device comprising:
multiple spur gears;
a pressure measurer configured to collect parameters associated with a node pressure of the multiple spur gears;
a gear stiffness calculator configured to calculate a tooth surface contact stiffness K based on a rough surface of the multiple spur gears by:

partitioning each tooth surface of the multiple spur gears using a hexagonal mesh partition manner to provide a plurality of square meshes such that an area of each square mesh of the plurality of square meshes is identical and is expressed as $A_o$, calculating a contact pressure distribution of a smooth surface of the multiple spur gears to extract the node pressure of contact areas of the multiple spur gears based on the collected parameters, the node pressure represented by $P_i$, calculating a normal contact stiffness $K_N$ and a tangential contact stiffness $K_T$ of a single square mesh of the plurality of square mesh based on a fractional theory using $A_o$ and $P_i$, and calculating a tooth surface contact stiffness K based on the $K_N$ and the $K_T$; and a reducer configured to modify a speed of the multiple spur gears based on the calculated tooth surface contact stiffness K of the multiple spur gears.

2. The device of claim 1, wherein $A_o$ is calculated using equation: $A_0 = l^2$ mm$^2$, and a side length of the area of each square mesh is 1 mm.

3. The device of claim 2, wherein the parameters comprise material features of each gear of gear pairs of the multiple spur gears, contract pairs, central holes for fixing a passive gear of the gear pairs, and the extracting the node pressure of the contact areas of the multiple spur gears based on the contact pressure distribution comprises:

obtaining the gear pairs of the multiple spur gears after the partition;

obtaining a stress and strain cloud image of a specific contact surface of a current gear based on imposed torque T on the axis of a driving gear of the gear pairs and the parameters; and extracting the node pressure $P_i$ using of the stress and strain cloud image.

4. The device of claim 1, wherein each square mesh used in FEA (finite element analysis) is small enough such that the extracted node pressure $P_i$ is an inner contacting pressure inside each square mesh on each tooth surface and a contact force of different square meshes on each tooth surface is expressed as:

$$F_i = P_i A_0 \quad (1)$$

a machined tooth surface has fractal feature and has local and global self-similarity; the outline of rough tooth surface is expressed as a W-M function:

$$z(x) = G^{(D-1)} \sum_{n=0}^{n_{max}} \left( \frac{\cos 2\pi \gamma^n x}{\gamma^{(2-D)n}} \right) 1 < D < 2, \gamma > 1 \quad (2)$$

n represents frequency index, n=0 and $n_{max}$ represents sequence corresponding to minimum and maximum cut-off frequency, z represents the height of rough surface outline, D represents fractal dimension, γ represents dimension parameter of spectral density, G represents roughness parameter, x represents sampling length coordinates; gear square sample is obtained by using same material and processing method, tooth surface morphology coordinates is obtained by surface plasmon resonance analyzer, D and G is obtained through matching W-M function with power spectral density method;

distribution regularities of micro-bulge cross-section area a' satisfies:

$$n(a') = \frac{1}{2} D \psi^{(2-D)/2} a_L'^{D/2} a'^{-(2+D)/2} \quad 0 < a' \leq a_L' \quad (3)$$

a' represents a cross-section area of the micro-bulge before deformation associated with stiffness surface, a represents the cross-section area of the micro-bulge after deformation associated with stiffness surface which is defined as real contact area, when elastic deformation of micro-bulge happened a'=2a, when plastic deformation of micro-bulge happened a'=a, D represents fractal dimension, $a_L'$ represents maximum cross-section area, φ represents domain development factor, a transcendental equation (4) is obtained:

$$[\psi^{(2-D)/2} - (1+\psi^{-D/2})^{-(2-D)/D}]/[(2-D)/D] = 1 \quad (4)$$

deformation of micro-bulge is divided into elastic and plastic according to different cross-section area of micro-bulge, cross-section area which determines plastic or elastic deformation of micro-bulge is called as critical cross section area, which is determined by material properties of gear pair:

$$a_c' = 2a_c = 2 \left( \frac{2E^*}{H} \right)^{2/(D-1)} G^2 \quad (5)$$

H represents hardness of soft material, H=2.8 Y, Y represents yield strength value; $E^*$ represents equivalent elastic modulus, $$E^* = \frac{1-v_1^2}{E_1} + \frac{1-v_2^2}{E_2}, E_1, E_2, v_1, v_2$$

represents elasticity modulus and poisson ratio of two contact tooth surface respectively; if micro-bulge cross section area a'>$a_c'$, elastic deformation happened, if a'≤$a_c'$, plastic deformation happened, normal deformation of single micro-bulge of rough surface is expressed by middle peak-valley amplitude of W-M function, $$\delta = 2^{3-D} G^{(D-1)} (\ln \gamma)^{1/2} \pi^{(D-2)/2} (a')^{(2-D)/2} \quad (6)$$

curvature R of single micro-bulge is:

$$R = \frac{a'^{D/2}}{2^{4-D} \pi^{D/2} G^{D-1} (\ln \gamma)^{1/2}} \quad (7)$$

elastic or plastic deformation for single micro-bulge, its normal load f and cross section area a' satisfies:

$$f_e = \frac{4}{3} E^* R^{\frac{1}{2}} \delta^{\frac{3}{2}} \quad (8)$$

$$f_p = H a' \quad (9)$$

subscripts e and p represent elastic and plastic deformation, respectively, $$E^* = \frac{1-v_1^2}{E_1} + \frac{1-v_2^2}{E_2}$$

represents equivalent elastic modulus, H represents hardness of a soft material, H=2.8 Y, R and δ represents curvature and normal deformity of a single micro-bulge respectively;

elastic deformation force $F_E$ and total plastic deformation force $F_P$ is expressed as:

$$F_E = \int_{a'_c}^{a'_L} f_e n(a')da' = \begin{cases} \frac{2^{(9-2D)/2}D}{3(3-2D)\pi^{(3-D)/2}} E^*(\ln\gamma)^{1/2} G^{(D-1)} \times \\ \psi^{1-\frac{D}{2}} a'_L{}^{\frac{D}{2}} \left(a'_L{}^{\frac{3}{2}-D} - a'_c{}^{\frac{3}{2}-D}\right) \quad (D \neq 1.5) \\ 2E^*\psi^{\frac{1}{4}}\pi^{-\frac{3}{4}}(\ln\gamma)^{\frac{1}{2}} G^{\frac{1}{2}} a'_L{}^{\frac{3}{4}} \ln\frac{a'_L}{a'_c} \quad (D = 1.5) \end{cases} \quad (10)$$

$$F_P = \int_0^{a'_c} f_p n(a')da' = \frac{HD\psi^{(2-D)/2}}{2-D} a'_L{}^{D/2} a'_c{}^{(2-D)/2} \quad (11)$$

a total inner contact pressure inside the single square mesh is obtained as:

$$F_i = F_E + F_P. \quad (12)$$

5. The device of claim 1, wherein a maximum across section area $a'_l$ of a single square mesh of the plurality of square meshes is obtained through equation (1) and (12); as for a single micro-bulge, its deformation is divided into total elastic and total plastic deformation, at plastic deformation stage, stiffness=0; according to stiffness definition, the normal contact stiffness of the single micro-bulge which occurs total elastic deformation is expressed as:

$$k_n = \frac{df_e}{d\delta} = \frac{df_e/da'}{d\delta/da'} = \frac{4E^*(3-D)}{3\sqrt{2\pi}(2-D)} a'^{\frac{1}{2}} \quad (13)$$

normal contact stiffness inner single square mesh is obtained through integration for the total elastic area:

$$K_N = \int_{a'_c}^{a'_L} k_n n(a')da' = \\ \frac{4E^*(3-D)D}{3\sqrt{2\pi}(1-D)(2-D)} \times \psi^{1-D/2} a'_l{}^{D/2}(a'_l{}^{(1-D)/2} - a'_c{}^{(1-D)/2}) \quad (14)$$

tangential deflection $\delta_t$ of single micro-bulge is expressed as:

$$\delta_t = \frac{3\mu f}{16G'r}\left[1 - \left(1 - \frac{t}{\mu f}\right)^{2/3}\right] \quad (15)$$

μ represents static friction coefficient, G' represents effective shear modulus of junction surface and satisfies: $1/G'=(2-v_1)/G_1+(2-v_2)/G_2$, $v_1$, $v_2$, $G_1$, $G_2$ represent poisson ratio and shear modulus of two kinds of materials, t and f represents tangential and normal load, r represents real contact area radius of single micro-bulge $r=\sqrt{a/\pi}$, a represents real contact area;

therefore, tangential stiffness single micro-bulge is expressed as:

$$k_t = \frac{dt}{d\delta_t} \quad (16)$$

as for tangential load t and normal load f of single micro-bulge:

$$\frac{t}{f} = \frac{T}{F_i} \quad (17)$$

$T=\tau_b A_r$, $\tau_b$ represents shearing strength, $A_r$ represents actual contact area of the square mesh, $$A_r = \int_0^{a'_c} a'n(a')da' + \frac{1}{2}\int_{a'_c}^{a'_L} a'n(a')da' = \\ \frac{D}{4-2D}\psi^{1-\frac{D}{2}} a'_L{}^{D/2}(a'_L{}^{1-D/2} + a'_c{}^{1-D/2}) \quad (18)$$

tangential stiffness of single square mesh $K_T$ is expressed as:

$$K_T = \int_{a'_c}^{a'_L} k_t n(a')da' = \\ \frac{8G'D\psi^{(2-D)/2}}{\sqrt{2\pi}(1-D)}\left(1 - \frac{T}{\mu P}\right)^{1/3} \times a_L^{D/2}(a'_L{}^{(1-D)/2} - a'_c{}^{(1-D)/2}). \quad (19)$$

6. The device of claim 1, wherein a number of the plurality of square meshes on a specific tooth surface is m, the normal contact stiffness of contact tooth surface $K_1$ is expressed as:

$$K_1 = \sum_{i=1}^{m} K_N \quad (20)$$

the tangential contact stiffness of contact tooth surface $K_2$ is expressed as:

$$K_2 = \sum_{i=1}^{m} K_T \quad (21)$$

the tooth surface contact stiffness K is expressed as:

$$K = K_1 \cos\alpha + K_2 \sin\alpha \quad (22)$$

α represents pressure angle.

* * * * *